US008949769B2

(12) United States Patent
Biehl et al.

(10) Patent No.: US 8,949,769 B2
(45) Date of Patent: Feb. 3, 2015

(54) SPATIAL LAYOUT OF HIERARCHICAL SHARED RESOURCES

(75) Inventors: Jacob T. Biehl, Champaign, IL (US);
George G. Robertson, Seattle, WA (US); Gregory R. Smith, Bellevue, WA (US); Mary P. Czerwinski, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1998 days.

(21) Appl. No.: 11/678,494

(22) Filed: Feb. 23, 2007

(65) Prior Publication Data
US 2008/0209387 A1 Aug. 28, 2008

(51) Int. Cl.
*G06F 9/44* (2006.01)

(52) U.S. Cl.
CPC .................................... *G06F 8/71* (2013.01)
USPC ............................ 717/101; 717/122; 717/170

(58) Field of Classification Search
None
See application file for complete search history.

(56) References Cited

U.S. PATENT DOCUMENTS

| | | | | |
|---|---|---|---|---|
| 4,558,413 | A * | 12/1985 | Schmidt et al. ............. | 717/170 |
| 5,220,657 | A | 6/1993 | Bly et al. | |
| 5,734,882 | A * | 3/1998 | Lopresti et al. ............. | 345/179 |
| 5,842,020 | A * | 11/1998 | Faustini ....................... | 717/111 |
| 5,861,883 | A | 1/1999 | Cuomo et al. | |
| 5,917,498 | A * | 6/1999 | Korenshtein ................ | 345/619 |
| 5,953,525 | A * | 9/1999 | Glaser et al. ................ | 717/105 |
| 6,078,327 | A * | 6/2000 | Liman et al. ................ | 715/854 |
| 6,247,020 | B1 * | 6/2001 | Minard ......................... | 1/1 |
| 6,349,327 | B1 * | 2/2002 | Tang et al. ................... | 709/205 |
| 6,393,437 | B1 * | 5/2002 | Zinda et al. ................. | 717/124 |
| 6,430,567 | B2 | 8/2002 | Burridge | |
| 6,448,978 | B1 | 9/2002 | Salvador et al. | |
| 6,493,868 | B1 | 12/2002 | DaSilva et al. | |
| 6,507,845 | B1 * | 1/2003 | Cohen et al. ................ | 707/608 |
| 6,993,710 | B1 | 1/2006 | Coad et al. | |
| 7,000,220 | B1 * | 2/2006 | Booth .......................... | 717/110 |
| 7,007,235 | B1 | 2/2006 | Hussein et al. | |
| 7,089,497 | B2 | 8/2006 | Abbott et al. | |

(Continued)

OTHER PUBLICATIONS

Froehlich et al, "Unifying Artifacts and Activities in a Visual Tool for Distributed Software Development Teams", ICSE '04 Proceedings of the 26th International Conference on Software Engineering, 2004.*

(Continued)

*Primary Examiner* — Lewis A Bullock, Jr.
*Assistant Examiner* — Christine Dang
(74) *Attorney, Agent, or Firm* — Sandy Swain; Judy Yee; Micky Minhas

(57) ABSTRACT

A hierarchical shared resources spatial visualization system and method including a visualization runtime user interface that quickly and efficiently displays a spatial layout of a shared resource having a hierarchical nature. The user interface provides a spatial layout of the hierarchical shared resource and overlays salient activity information of a group's interaction with the shared resource. In software development, the user interface provides software teams with awareness of activity by other developers in the group regarding files in the shared source code base. The salient activity includes active file information (such as which files are open and by whom) and source repository actions (such as a developer's activity within a project's source repository system). Visual geometry and colors are employed to create a visually distinctive environment that is used to convey the salient activity information quickly and efficiently.

20 Claims, 4 Drawing Sheets

(56) References Cited

U.S. PATENT DOCUMENTS

| | | | |
|---|---|---|---|
| 7,747,684 B2* | 6/2010 | Karube et al. | 709/204 |
| 7,757,210 B1* | 7/2010 | Krueger | 717/120 |
| 7,788,647 B2* | 8/2010 | Martin et al. | 717/135 |
| 8,407,670 B2* | 3/2013 | Hegde et al. | 717/122 |
| 2004/0153994 A1* | 8/2004 | Bates et al. | 717/110 |
| 2005/0114789 A1 | 5/2005 | Chang et al. | |
| 2005/0165920 A1 | 7/2005 | Kerr et al. | |
| 2005/0289512 A1* | 12/2005 | Matsusaka | 717/120 |

OTHER PUBLICATIONS

Baker, M. J., S. G. Eick, Space filling software visualization, J. of Visual Languages and Computing, 1995, vol. 6, pp. 119-133.

Berry, L., L. Bartram, K. S. Booth, Role-based control of shared application views, Proc. of the 18th Annual ACM Symposium on User Interface Software and Technology, 2005, pp. 23-32, Seattle, WA, USA.

Biehl, J. T., B. P. Bailey, Improving interfaces for managing applications in multiple-device environments Proc. of the Working Conf. on Advanced Visual Interfaces, 2006, pp. 35-42, Venezia, Italy.

Bruls, M., K. Huizing, and J. J. van Wijk, Squarified treemaps, Proc. of the Joint Eurographics and IEEE TCVG Symposium on Visualization, 2000, pp. 33-42.

Cockburn, A., L. Williams, Extreme Programming Examined., Succi, G. And Marcheis, M. eds., Addison-Wesley, 2001, pp. 223-243.

Curtis, B., H. Krasner, N. Iscoe, A field study of the software design process for large systems, CACM, Nov. 1988, pp. 1268-1287, vol. 31, No. 11.

Daniel, B., Adding presence awareness to your IBM Workplace portlet, IBM, May 31, 2005.

DeLine, R., M. Czerwinski, B. Meyers, G. Venolia, S. Drucker, G. Robertson, Code thumbnails: Using spatial memory to vavigate source code, IEEE Symposium on Visual Languages and Human-Centric Computing, Sep. 2006, pp. 11-18.

DeLine, R., M. Czerwinski, G. Robertson, Easing program comprehension by sharing navigation data, Proc. of the 2005 IEEE Symposium on Visual Languages and Human-Centric Computing, 2005, pp. 241-248.

Dourish, P., V. Bellotti, Awareness and coordination in shared workspaces, Proc. of the 1992 ACM Conference on Computer-supported cooperative work, Toronto, 1992, pp. 107-114, Ontario, Canada, ACM Press.

Eick, S. G., J. L. Steffen, E. E. Sumner, Jr., Seesoft—A tool for visualizing line oriented software statistics, IEEE Transactions on Software Eng'g, Nov. 1992, pp. 957-968, vol. 18, No. 11.

Estublier, J., S. Garcia, Process model and awareness in SCM, Proc. of the 12th Int'l Workshop on Software Configuration Management, 2005, pp. 59-74, Lisbon, Portugal.

Froehlich, J., P. Doruish, Unifying artifacts and activities in a visual tool for distributed software,Proc. of the 26th Int'l Conf. on Software Eng'g, 2004, pp. 387-396.

Gutwin, C., and S. Greenberg, The importance of awareness for team cognition in distributed collaboration, Team Cognition: Understanding the Factors that Drive Process and Performance, 2004, E. Salas and S. Fiore, eds., pp. 177-201.

Gutwin, C., and S. Greenberg, 2000, The mechanics of collaboration: Developing low cost usability evaluation methods for shared workspaces, Proc. of IEEE Workshop on Enabling Technologies—Infrastructure for Collaborative Enterprises, pp. 116-121.

Gutwin, C., R. Penner, and K. Schneider, Group awareness in distributed software development, Proc. of the ACM Conf. on Computer-Supported Cooperative Work, 2004, pp. 72-81.

Handley, M., and J. Crowcroft, Network text editor (NTE) a scalable shared text editor for MBone, ACM Comp. Comm. Review, ACM SIGCOMMM'97, Sep. 1997, pp. 197-208, vol. 27.

Hannemann, J., G. Kiczales, Overcoming the prevalent decomposition in legacy code, 23rd International Conference on Software Engineering (ICSE) Workshop on Advanced Separation of Concerns, 2001.

Jones, J. A., M. J. Harrold, J. Stasko, Visualization of test information to assist fault localization, Proc. of the 24th Int'l Conf. on Software Eng'g, May 19-25, 2002, Orlando, Florida.

Kenett, R. S., Setting up the software development management dashboard: A case study in software product and process improvement, available at www.kpa.co.il/softrel/DOWNLOAD/SDMD.doc.

Kraut, R. E., L. A. Streeter, Coordination in software development, Comm. of the ACM, Mar. 1995, pp. 69-81, vol. 38, No. 3.

Latoza, T. D., G. Venolia, and R. DeLine, Maintaining mental models: A study of developer work habits, Proc. of the 28th Int'l Conf. on Software Eng'g, 2006, pp. 492-501, ACM Press.

Perry, D. E., N. Staudenmayer, L. G. Votta, People, organizations, and process improvement, IEEE Software, Jul. 1994, pp. 36-45, vol. 11, No. 4.

Shonle, M., J. Neddenriep, W. Griswold, AspectBrowser for eclipse: A case study in plug-in retargeting, Proc. of the 2004 OOPSLA Workshop on Eclipse Tech. eXchange, 2004, pp. 78-82, Vancouver, British Columbia, Canada.

Singer, J., Practices of software maintenance, Proc. of the Int'l Conf. on Software Maintenance, Bethesda, MD, Nov. 1998, pp. 139-145.

Tang, J. C., Findings from observational studies of collaborative work, Int'l J. of Man-Machine Studies, Feb. 1991, pp. 143-160, vol. 34, No. 2.

Tee, K., S. Greenberg, and C. Gutwin, Providing artifact awareness to a distributed group through screen sharing, Proc. of the 2006 20th Anniversary Conf. on Comp. Supported Cooperative Work, 2006, pp. 99-108, Banff, Alberta, Canada.

Wu, J., T. C. N. Graham, P. W. Smith, A study of collaboration in software design, Proc. of the 2003 Int'l Symposium on Empirical Software Eng'g, pp. 304.

Xia, S., D. Sun, C. Sun, D. Chen, H. Shen, Leveraging single-user applications for multi-user collaboration: the coword approach, Proc. of the 2004 Acm Conf. on Comp. Supported Cooperative Work, 2004, pp. 162-171, Chicago, Illinois, USA.

Concurrent versions system (CVS) available at http://www.nongnu.org/cvs/.

Microsoft Team Foundation Server, available at http://msdn.microsoft.com/vstudio/teamsystems/team/.

Subversion (SVN), available at http://subversion.tigris.org/.

Windows Live Messenger, available at http://messenger.live.com/.

RTI, "The Economic Impacts of Inadequate Infrastructure for Software Testing", Planning Report 02-3, Research Triangle Institute, May 2002.

Microsoft, "Microsoft NetMeeting", Retrieved From: <<https://web.archive.org/web/20020521055223/http://www.microsoft.com/windows/Netmeeting/>>, May 2002.

Bales, Interaction Process Analysis: A Method for the Study of Small Groups, Addison-Wesley Press, Cambridge Massachusetts, 1950.

Olson, "Small Group Design Meetings: An Analysis of Collaboration", Human Computer Interaction, vol. 7, pp. 347-374, 1992.

Schwaber, Agile Software Development with Scrum, Prentice Hall, New Jersey, 2002.

Taylor, "Situational Awareness Rating Technique (SART): The Development of a Tool for Aircrew System Design", Situational Awareness in Aerospace Operations (AGARD-CP-478), pp. 3/1-3/17, Oct. 6, 1989.

* cited by examiner

SPATIAL LAYOUT OF HIERARCHICAL SHARED RESOURCES

BACKGROUND

There is a growing demand for software companies to produce reliable, defect-free software. While the causes of software defects are varied, a significant proportion of errors are caused during the software development stage by a poor collective understanding of project status and of fellow team member activities.

Software programmers spend significant time gaining and maintaining awareness of fellow developers' activities. Unlike other collaborative jobs where workers can observe each others' activities as they physically move and perform actions within their shared workspace, programmers use electronic tools to operate in a shared virtual environment where other programmers' activities are difficult (or even impossible) to observe directly. This significantly increases the effort for programmers to gain and maintain an awareness of how their workspace is changing.

Many software development teams leverage innovative methodologies to increase awareness and cooperation among programmers. These methodologies increase awareness and team interaction by employing shortened, highly iterative development cycles and co-locating programmers in the same physical workspace. However, programmers still lack adequate tools to support sufficient ongoing awareness of other group members' actions. For example, even with the methodologies currently in use, key pieces of awareness information (such as who is working with which source files) are difficult to determine.

Several tools have been created to enhance an individual's awareness and understanding of large software shared code bases. One such tool provides a line-based view of the code. Each line of code is mapped to a thin row in a column which represents a code file. Rows are colored to represent a particular attribute of the code line. For example, lines that have recently changed appear red, and blue if they are the least recently changed. Another awareness tool provides miniaturized views of code files that can be arranged spatially. Highlights are shown on the sections of files that the programmer has open in the code editor. Programmers can also click on the thumbnails to navigate within the code base. Yet another awareness tool provides programmers with cumulative information about how fellow developers have navigated a code base in the past. This enables programmers to build on the actions of others, to better understand and navigate the code themselves. However, while these awareness tools focus on improving understanding and navigation of a large code base (such as what files contain which classes and methods, or what sections of code have changed in the past), they are still unable to provide a real-time awareness of fellow team members' activities within the shared code base. For example, these awareness tools cannot indicate who has which file open, or what files are currently being edited.

Another type of awareness tool provides a line-oriented view but combines activity information as one of the visualization attributes. Some awareness tools provide programmers with a per-line level view of activity, which are good for learning specific changes within a single or small set of code files. However, this line-oriented view has difficulty accommodating large code bases.

Another type of awareness tool enables programmers to view a historical evolution of changes for an entire code base. Using a space-filling representation of the code base, the visualization highlights changes using animations of different code snapshots over time. However, these types of awareness tools do not allow programmers to quickly determine and maintain an awareness of the activities currently occurring in the code base or to coordinate the ongoing activities of programmers in a shared code base.

There also are tools that enhance group awareness. Group awareness, which is essential to effective collaboration, is the understanding of who you are working with, what is being worked on, and how your actions affect others. A common method for gaining and maintaining this awareness is through the use of shared artifacts. Several group awareness tools exist that convey status of shared artifacts. Some of these group awareness tools allow collaborators to share views of artifacts currently open on their screens with other collaborators. Other types of group awareness tools extend the capabilities to gain artifact awareness when working within a physical workspace composed of multiple shared and personal devices. Still other types of group awareness tools enable users to collaboratively work inside a shared document workspace. However, these group awareness tools lack a holistic view of the entire shared workspace. In addition, these tools merely replicate a collaborator's local workspace to remote users and do not extract and visualize only key individual activity information that is useful in an overview of workspace activity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The hierarchical shared resources spatial visualization system and method disclosed herein includes an interactive visualization that improves a software development group's awareness of each others' activities. The system and method use spatial representation of the shared code base to highlight developers' current activities in relation to the code. A visualization runtime user interface allows a developer to quickly determine which team members have source files checked out, which files are being viewed, and what methods and classes are currently being changed. The user interface can be annotated, allowing developers to supplement activity information with additional status details. The user interface provides immediate awareness of potential conflict situations, such as two developers editing the same source file.

The hierarchical shared resources spatial visualization system and method differs from existing awareness tools in at least two ways. First, the hierarchical shared resources spatial visualization system and method provides a holistic view of the entire shared workspace. Second, the hierarchical shared resources spatial visualization system and method does not replicate a collaborator's local workspace to remote users, but rather extracts and visualizes just the key individual activity information useful in an overview of workspace activity. The hierarchical shared resources spatial visualization system and method can be used in any work environment where many shared artifacts exist within the workspace, where those artifacts are usually accessed by multiple users, and where there is a need for collaborators to maintain awareness of how those artifacts are being used.

In general, the hierarchical shared resources spatial visualization system and method includes a front-end visualization runtime embodied in a user interface, a software development platform plug-in, and a structured query language (SQL) database. The user interface is a spatial layout of a shared resource having a hierarchical nature (such as shared source code files). In other words, for a shared source code base the folders in the code base are displayed as well as the files in each folder.

Overlaid on the spatial layout is the salient activity information relating to actions of developers in the group. These salient activities include active file information and source repository actions. Visual geometry (such as borders, checkmarks, and icons) and color (such as colored backgrounds and borders) are employed to create a visually distinctive environment that is used to convey the salient activity information quickly and efficiently. The visualization runtime user interface also allows developers to attach comments to specific files and marks these comments with flags. Developers are able to view or edit a comment by clicking on a particular flag.

The visualization runtime user interface enables immediate access to key information for group awareness. Such information includes which code files are changing, who is changing them, and how they are being used. The user interface can be displayed on a large display in the shared workspace or on a second personal display so that developers are provided a common, shared source for team activity awareness.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

Figure 1:
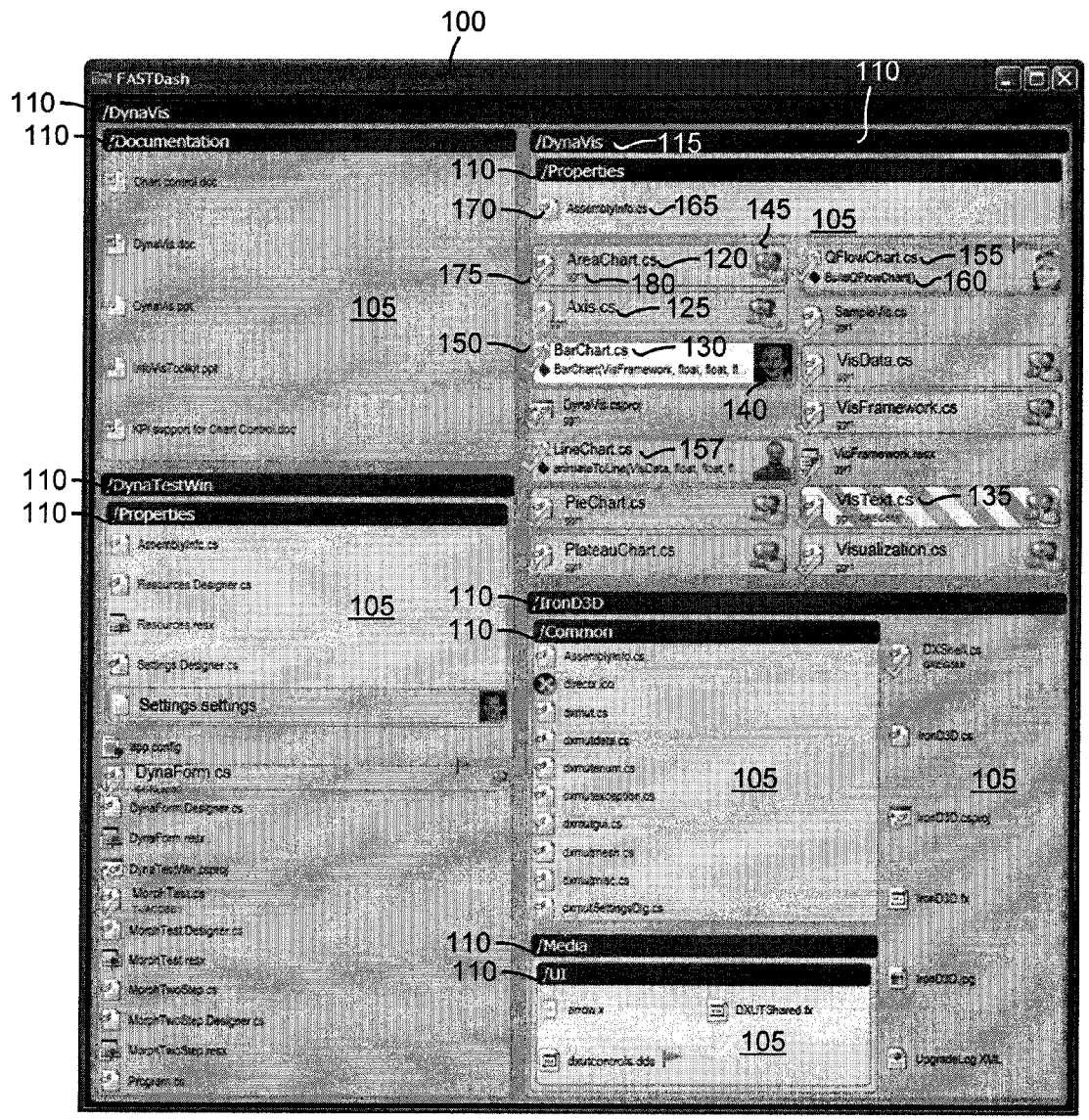
FIG. 1 illustrates a first exemplary embodiment of the visualization runtime user interface of the hierarchical shared resources spatial visualization system and method disclosed herein.

In the following description of the hierarchical shared resources spatial visualization system and method, reference is made to the accompanying drawings, which form a part thereof, and in which is shown by way of illustration a specific example whereby the hierarchical shared resources spatial visualization system and method may be practiced. It is to be understood that other embodiments may be utilized and structural changes may be made without departing from the scope of the claimed subject matter.

I. Operational and System Details

The hierarchical shared resources spatial visualization system and method includes three components: (1) a front-end visualization runtime embodied in a user interface; (2) a plug-in for the software development platform (such as Visual Studio® by Microsoft® Corporation) being used by the development group; and (3) a structured query language (SQL) database (such as SQL Server 2005 by Microsoft® Corporation). The hierarchical shared resources spatial visualization system and method also uses a source control management (SCM) system for source file data. The hierarchical shared resources spatial visualization system and method supports existing SCM systems and alternative repository systems (such as Concurrent Versions System (CVS) and Subversion (SVN)). Each of these components will now be discussed in detail.

Software Development Platform Plug-in and SQL Database

The software development platform plug-in is responsible for providing activity data to a central SQL server for use by the visualization runtime user interface. In one embodiment, the plug-in uses the standard Visual Studio® plug-in application programming interface (API) to monitor which files are open, the current development modality (such as edit or debug), which file the developer is currently working in (known as the "file in focus"), and on which method or class the developer is working. Each running instance of the plug-in maintains a connection to the central SQL database and reports its active files to this server. In one embodiment, the plug-in identifies itself by machine name, user, and process ID. The plug-in also periodically polls the SCM system for file checkout status and uses hash signatures of the local and repository files to determine if a checked out file has been changed.

Multiple instances of the plug-in for a given workstation cooperate so that only one plug-in takes responsibility for reporting these source repository actions to the central server at any given time. In one embodiment, in order to keep all active files and source repository states consistent and current, the server maintains a list of reporting processes and periodically cleans up after processes that have unexpectedly stopped reporting. The polling and server communication of the plug-in is performed on a background thread to avoid interfering with a developer's user interface experience.

Visualization Runtime User Interface

The visualization runtime user interface provides developers with several pieces of key information to enhance awareness of programming activities of a group of developers in a software development environment. At the foundation of the user interface is a spatial layout or representation of the shared source code base. Within the representation, folders are visualized as nested rectangles and the size of each rectangle is based on the number of files contained in the folder. It should be noted that in alternate embodiments other metrics may be used to determine the size of the various rectangles and sub-rectangles. By way of example, these alternate metrics include the importance to the project of a file or file group, or an amount of activity in a file or file group. Files are represented in the user interface by a textual label of the file's name and icon. Representing files and folders in this way has the advantage of allowing the layout to remain spatially stable as items are added and removed from the shared code base. While some embodiments of the visualization runtime user interface focus on files in a code base, alternate embodiments include a visualization of the work items assigned to users in a development project. In these embodiments, for example, size then can be determined by a length of time working on a particular item.

Salient activity information by the group using the shared source code base is overlaid on the spatial representation. In general, there are two types of activities that are overlaid: (1) active file actions; and (2) source repository actions. Active file actions are based on a developer's activity within his or her current software development platform session or sessions. File action information is useful because it helps convey the presence and interest of a developer within areas of the shared code base.

In one embodiment, the visualization runtime user interface is designed to be viewed on a shared display (such as a hallway display or projected display in a common work area) where it can be seen by everyone working on a project. In other words, each developer within the group working on the shared code base can see the user interface. In alternate embodiments, the user interface also can be displayed on an individual display, or on both a shared display and individual displays. The visualization runtime user interface queries the SCM system at startup to build the source file hierarchy, and subsequently begins polling the central SQL database for team activity. Thus, as an independent executable process, the visualization runtime user interface can easily be placed on a shared screen in a group's workspace, on an individual programmer's workstation, or on a small peripheral display.

Color is used in the user interface to indicate various types of activity. The basic idea of color is to provide a distinctive visual property that quickly and efficiently conveys the importance of salient activity information relating to the shared code base. Thus, if a first activity on the shared code base is more important for the development group to be aware of than a second activity, the visual property (or color) that represents the first activity is more distinct than the visual property (or color) of the second activity. In certain embodiments, that may mean that the color of the first activity is brighter or has a higher contrast than the color of the second activity. Colors used in the user interface should be distinct from each other and easily visible on a display device. In some embodiments, a user can select which colors represent which features and activities.

Borders and backgrounds of various colors are shown on certain files if the file has been opened inside of the software development platform. Different colors indicate different types of activities that are being performed by developers. A colored border around a file indicates that a developer has the file currently in view in his development environment. The use of color allows developers to quickly obtain a contextual footprint of where other developers in the group are working. Thus, if several developers are in the same part of the code base, potential conflicts and activity overall can be easily understood by the group using the visualization runtime user interface. It should be noted that although certain colors are shown in the following figures to indicate certain activity, these colors can easily be changed manually by a user or automatically by the system.

In general, the user interface is a map of the shared code base. FIG. 1 illustrates a first exemplary embodiment of the visualization runtime user interface 100 of the hierarchical shared resources spatial visualization system and method. In the embodiment of FIG. 1, three developers are shown working in a shared code base. The user interface 100 includes a first set of display areas 105 for listing names of a first level of a set of hierarchical shared resources. In the embodiment shown in FIG. 1, the set of hierarchical shared resources is a shared code base and the upper levels correspond to folders in the shared code base. Thus, at the top of each of the first set of display areas 105 are folder names 110.

As also shown in FIG. 1, each of the first set of display areas 105 includes a second set of display areas for listing names of a second level of the hierarchical shared resource. The second level shared resource names are below the first level shared resource names in the hierarchy. Moreover, it should be noted that additional levels of the hierarchical shared resource indicate and correspond to additional levels of the folder hierarchy. In the exemplary embodiment of FIG. 1, the lowest level shared resource names are file names, and the files are contained in the respective folder. This means that in addition to appearing in the lowest level, some of the files shown in FIG. 1 appear at higher hierarchical levels, such as at level 2, level 3, and level 4. The file names are shown in the user interface 100 as individual line items within each folder. To avoid clutter, each file name shown does not have a reference number in FIG. 1.

In the user interface 100, the larger rectangular areas are folders and the individual line items are files. Thus, it is easy to see the hierarchy of the entire shared code base. Referring to the upper right corner of FIG. 1 in the DynaVis folder 115 is where activity is occurring. A blue background in the files QFlowChart.cs 155 and LineChart.cs 157 in the DynaVis folder 115 indicates that those files are open inside a developer's Visual Studio® client. In this exemplary embodiment, a blue background indicates that the file is open, and a yellow background indicates that the file is currently being edited. For example, in FIG. 1 the file BarChart.cs 130 is currently being edited. When a file is being edited, this means that the file is different on the developer's computer from what exists in the source repository. Anytime a developer is working he is changing code. When a developer is confident that the code is working and satisfies all the requirements that he has set out to satisfy, then he will go back and check the file into the source repository. Until then, the file is in an "edit" state as represented in the user interface by a yellow background. This communicates to other developers that before they start editing that file or start depending on that file that they should communicate with the developer that currently has the file checked out. At the very least other developers should be aware that changes are occurring to the file.

Checkmarks are also used in the user interface 100 to indicate source repository activity, namely, whether a file has been checked out for editing. In the exemplary embodiment of FIG. 1, a yellow checkmark is used. For example, a yellow checkmark 175 adjacent the AreaChart.cs 120 file means that the file currently is checked out by a developer. A user identification 180 in small type below the name of the file is used to identify the developer who has the file checked out.

A hashed background of alternating bands of one color and another color indicates files that have been checked out from the repository by two or more people. For example, in FIG. 1 the VisText.cs file 135 has alternating bands of gray and red hash marks to indicate that the file 135 has been checked out from the repository by two people. Source repository systems allow this to occur, but within the culture of a team of developers this activity can potentially lead to conflicts in the codebase if the two people are not coordinating on the nature and locations of their individual changes. The hierarchical shared resources spatial visualization system and method system uses the user interface to bring this potentially dangerous situation to the attention of the developers.

To the right of some of the file names in FIG. 1 are user images and icons. If a file name has an icon or picture of a single developer, this indicates that a single person has the file open in the current state. However, if a file name has an icon or image of two or more people, then it means that multiple persons have the file open. For example, in FIG. 1 the file BarChart.cs 130 has an image of a single developer 140. This indicates that a single developer has that file open. In contrast, the file AreaChart.cs 120 has an icon of two persons 145, meaning that at least two persons have that file open. An executable process in the hierarchical shared resources spatial visualization system and method system allows a user to hover over a user icon such that a list appears in the user interface 100 of all users that have that particular file open.

Borders also are used in the user interface to indicate activity. In the exemplary embodiment of FIG. 1, a gold border around a file means the file is in focus. In focus means that the file that a developer is currently looking at on his display. A developer may have many files open in the software development platform, but file in the top window is the file that the developer is currently viewing, and is shown on the user interface 100 by the gold border. For example, in FIG. 1 the file BarChart.cs 130 has a gold border 150 indicating that the file is currently in focus by the single developer who has the file open. In addition, below the name of the file is text that indicates where the developer is in the file. For example, in FIG. 1 at the file called QFlowChart.cs 155 the single developer who has the file open is at the location in the file called BuildQFlowChart( ) 160. In addition, in an exemplary embodiment a ruby border around a file means the file is in focus and is being debugged. This is discussed below and shown in FIG. 2. In this situation, the file is being debugged and the code is being tested and not generated.

The backgrounds and borders discussed above are a set of overlays that indicate salient activity information of the group of developers working on the shared code base. This overlay of salient activity information pops up on the user interface 100 whenever a developer affects the shared code base. In addition, this salient activity information is updated on the user interface 100 automatically and in real time.

Next to each file name is an icon that is appropriate for that file. For example, each .cs file is shown as a C# (C-sharp) icon in FIG. 1. For example, the AssemblyInfo.cs file 165 in FIG. 1 includes a C# icon 170 to indicate that the file is a .cs file. An executable process in the hierarchical shared resources spatial visualization system and method system allow a user to customize the icon to indicate the file type. Thus, the file type icon can be customized by the user. This feature connects what users see with the file type.

Figure 2:
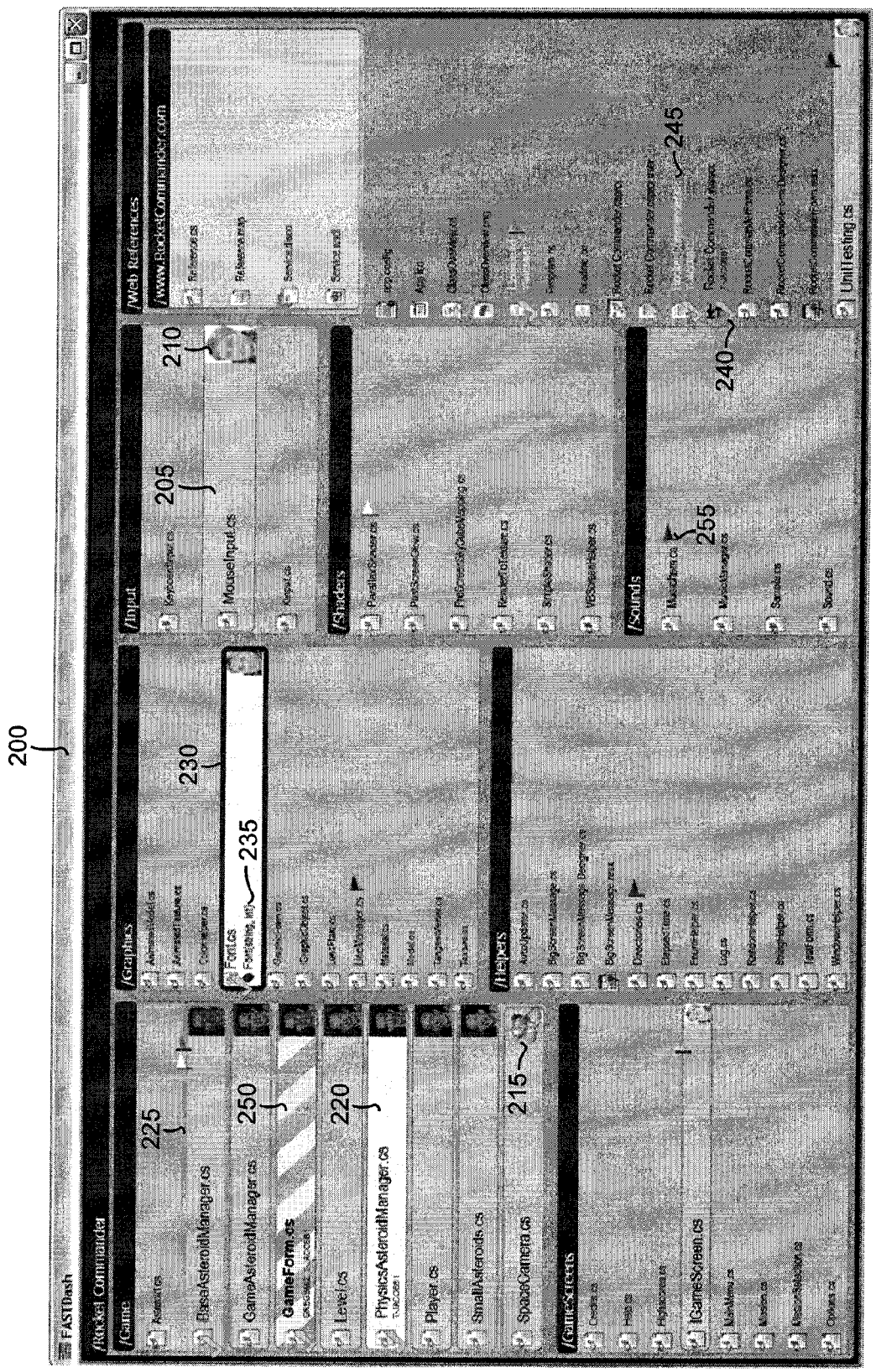
FIG. 2 illustrates a second exemplary embodiment of the visualization runtime user interface of the hierarchical shared resources spatial visualization system and method.

FIG. 2 illustrates a second exemplary embodiment of the visualization runtime user interface 200 of the hierarchical shared resources spatial visualization system and method. The embodiment of FIG. 2 illustrates the active file and source code repository activities for a software development project having two active developers. The salient activity information conveyed in FIG. 2 will now be discussed in detail.

One type of salient activity information includes active file information. This includes which files are open and by whom. For example, as shown in the exemplary embodiment of FIG. 2, a blue background 205 indicates a file currently is open by a developer. A photograph 210 of the single developer who has the file open is shown to indicate presence for open files. As stated above with reference to FIG. 1, a group icon 215 is shown when multiple developers have a file open. In addition, which files are currently being edited is also represented. For example, in FIG. 2 a yellow background 220 indicates that the file is open and is being edited by a developer.

The user interface 200 also indicates which file a developer currently is working on and what development modality (such as edit or debug) the programmer is using. For example, in FIG. 2 a gold border 225 indicates that a developer has the file in focus within the software development platform. Moreover, a ruby border 230 indicates that a developer has the file in focus and is in debug mode in the software development platform. If available and appropriate, the user interface 200 also indicates which method or class the programmer is currently editing, viewing, and debugging. For example, in FIG. 2 method/class information 235 for a file is provided when available.

Another type of salient activity information includes source repository actions. This type of activity is based on a developer's activity within a project's source repository system. Repository actions are useful because they allow fellow developers to understand how the shared source code base is currently changing.

This source repository information includes which files are checked out and to whom. For example, as stated above the yellow background 220 indicates that the file is open and is being edited by a developer. Moreover, a yellow checkmark 240 indicates that a file has been checked out. The salient activity information also includes which checked out files are different from the current version in the repository. For example, a file name in yellow text 245 indicates that a file has changed since it was checked out. The activity information also includes whenever there are potential checkout conflicts, such as when two or more developers have the same file checked out. For example, a hashed background 250 indicates that a file is currently checked out by two or more developers.

In addition to the development activities, the visualization runtime user interface also allows developers to attach comments to specific files. For example, in FIG. 2 a marker for existing comments is shown as a flag 255 near the file's name. This flag 255 indicates that a comment has been placed on the file. Each flag can have a different color as set by the creator of the comment or the system. These flags are mechanisms for developers to annotate files and have them easily recognized in the user interface. Developers can attach different messages to different flags.

Figure 3:
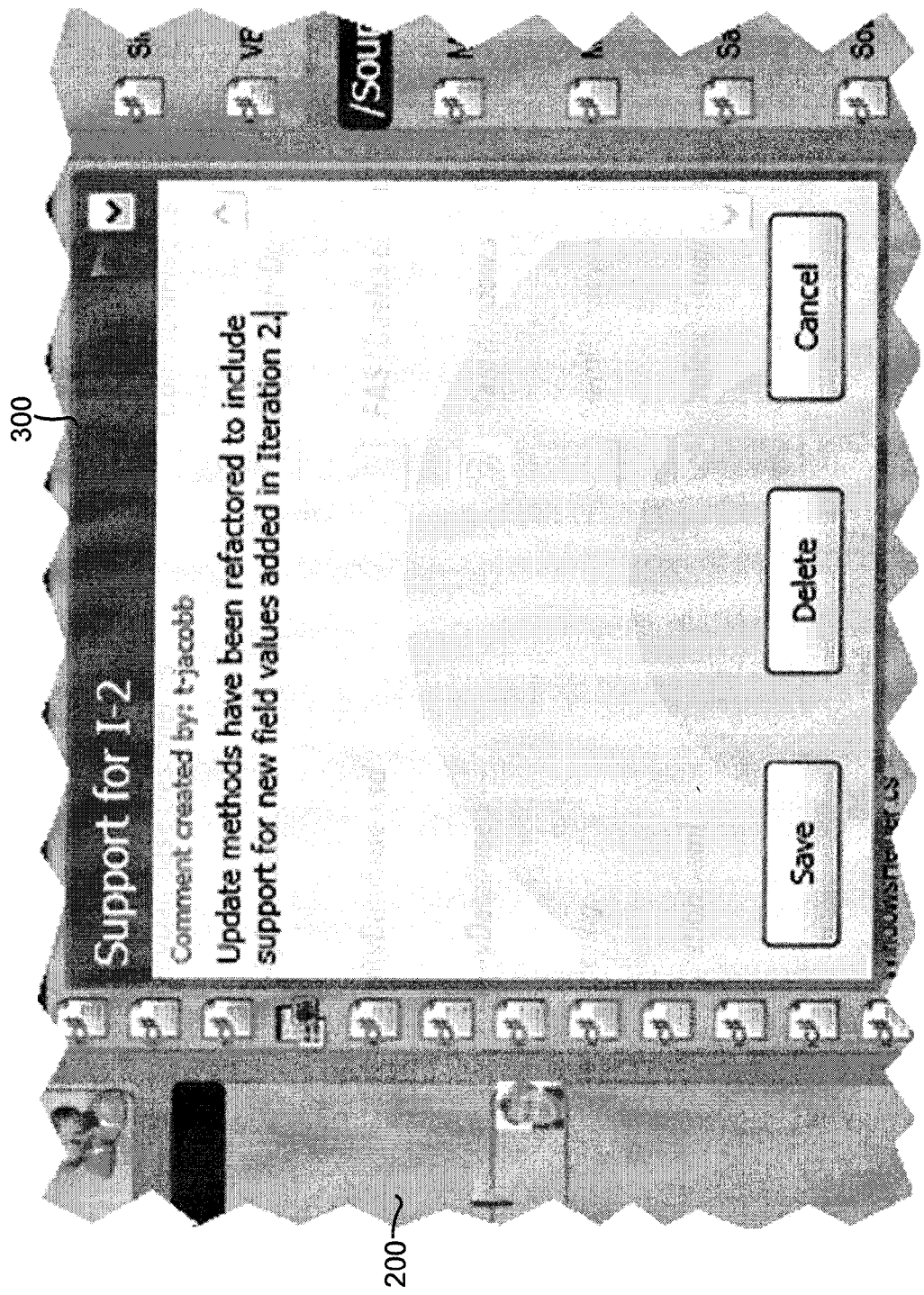
FIG. 3 illustrates a dialog box as it appears when a developer is viewing, updating, or adding a comment to a file.

Developers can view or edit a comment by clicking on a particular flag. FIG. 3 illustrates a dialog box 300 as it appears when a developer is viewing, updating, or adding a comment to a file. An executable process allows a developer to add new comments by right-clicking on a particular file and selecting the Add Comment option (not shown). Once the developer clicks on the file the dialog box 300 appears. The developer enters a comment, closes the dialog box 300, and then the flag 255 appears. In addition, the developer can click on the flag 255 to view or edit a flag using the dialog box 300.

In the discussion above file checkout was performed at the source repository. In alternate embodiments, the user interface includes an executable process that allows a developer to check files in and out from the developer's station. If desired, this embodiment is optimal when the user interface is used as a personal tool to keep aware of the actions of others in the group.

In some embodiments the layout of the visualization runtime user interface is controlled by an algorithm called a squarified tree map. This algorithm is well-known by those having ordinary skill in the art. The squarified tree map is a formula for recursively dividing up display device real estate. If a display device has x by y pixels that can be filled, the squarified tree map is given hierarchical data and determines a layout for that data. For any given hierarchy of raw data, the screen will be divided up in a certain manner. The hierarchy is determined in part by giving a weight to each file. Virtually any feature that is important can be a weight. In the end result the weight will have some correlation with the amount of display device space that the associated file is given. In some embodiments, the metric that was used for weight was the file size. In this embodiment larger files received more display device space. Other embodiments included other metrics that were used to allocate the space. For example, the largest files may not be the most interesting files. One thing that makes a file large is that it is a large image format. But developers typically do not work on image files, so using the file size as a metric may not be useful. Thus, in some embodiments a metric used is the amount of file activity.

II. Exemplary Operating Environment

The hierarchical shared resources spatial visualization system and method is designed to operate in a computing environment. The following discussion is intended to provide a brief, general description of a suitable computing environment in which the hierarchical shared resources spatial visualization system and method may be implemented.

Figure 4:
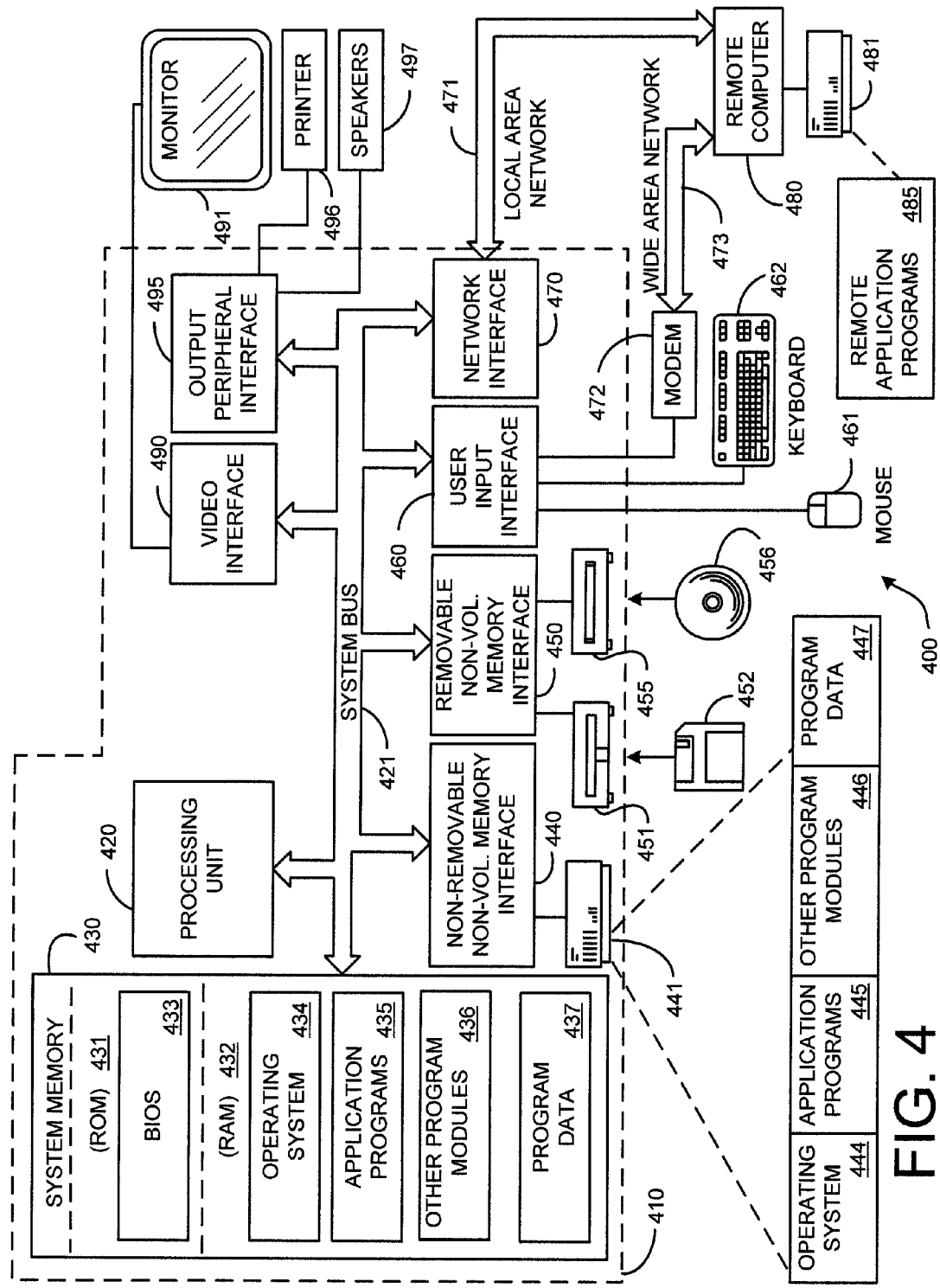
FIG. 4 illustrates an example of a suitable computing system environment in which the hierarchical shared resources spatial visualization system and method may be implemented.

FIG. 4 illustrates an example of a suitable computing system environment in which the hierarchical shared resources spatial visualization system and method may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment.

The hierarchical shared resources spatial visualization system and method is operational with numerous other general purpose or special purpose computing system environments or configurations. Examples of well known computing systems, environments, and/or configurations that may be suitable for use with the hierarchical shared resources spatial visualization system and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The hierarchical shared resources spatial visualization system and method may be described in the general context of computer-executable instructions, such as program modules, being executed by a computer. Generally, program modules include routines, programs, objects, components, data structures, etc., that perform particular tasks or implement particular abstract data types. The hierarchical shared resources spatial visualization system and method may also be practiced in distributed computing environments where tasks are performed by remote processing devices that are linked through a communications network. In a distributed computing environment, program modules may be located in both local and remote computer storage media including memory storage devices. With reference to FIG. 4, an exemplary system for the hierarchical shared resources spatial visualization system and method includes a general-purpose computing device in the form of a computer 410.

Components of the computer 410 may include, but are not limited to, a processing unit 420 (such as a central processing unit, CPU), a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer readable media. Computer readable media can be any available media that can be accessed by the computer 410 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 410. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 440 includes computer storage media in the form of volatile and/or nonvolatile memory such as read only memory (ROM) 431 and random access memory (RAM) 432. A basic input/output system 433 (BIOS), containing the basic routines that help to transfer information between elements within the computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information (or data) into the computer 410 through input devices such as a keyboard 462, pointing device 461, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 420 through a user input interface 460 that is coupled to the system bus 421, but may be connected by other interface and bus structures, such as, for example, a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A system comprising:
a processing unit; and
one or more volatile or nonvolatile computer-readable storage devices having stored thereon computer-executable instructions which, when executed by the processing unit, cause the processing unit to:
produce a user interface having a spatial layout of a set of hierarchical shared resources having a plurality of hierarchy levels, the user interface comprising:
a first set of display areas listing first names of a first level of shared resources in the set of hierarchical shared resources,
a second set of display areas listing second names of a second level of shared resources in the set of hierarchical shared resources, wherein the second level is relatively lower in the plurality of hierarchy levels than the first level, and
activity information that is displayed on the user interface with the first set of display areas and the second set of display areas, the activity information relating to activity of a group of users using the set of hierarchical shared resources,
wherein the set of hierarchical shared resources are associated with a repository and the activity information displayed on the user interface identifies a first developer from the group of users that currently has an individual shared resource open; and
provide the user interface to a second developer from the group of users other than the first developer that currently has the individual shared resource open.

2. The system of claim 1, wherein:
the set of hierarchical shared resources is a hierarchical file system containing a plurality of folders as the first level and a plurality of files as the second level, and the individual shared resource is an individual file that the first developer has open inside of a software development platform.

3. The system of claim 2, wherein the activity information displayed on the user interface also indicates at least one of: other files currently being debugged; other files that are also currently open; other files currently checked out by the first developer; other files currently checked out by more than one developer; or other files currently being viewed by the first developer.

4. The system of claim 3, wherein the plurality of files are source files used in software development.

5. The system of claim 1, wherein the computer-executable instructions cause the processing unit to:
automatically update the user interface to reflect further activity of the group of users over time.

6. The system of claim 1, wherein the user interface further comprises a visual property that conveys an importance of the activity information such that a first visual property of a first activity is different than a second visual property of a second activity.

7. The system of claim 6, wherein the first visual property is a first color that represents the first activity and the second visual property is a second color that represents the second activity.

8. The system of claim 7, further comprising:
a display device, wherein the computer-executable instructions cause the processing unit to display the user interface on the display device.

9. A system comprising:
computer-executable instructions; and
a processing unit,
wherein the computer-executable instructions, when executed by the processing unit, cause the processing unit to:
produce a user interface comprising:
display areas identifying folders contained in a shared code base,
individual line items in the display areas that represent files contained in corresponding folders of the shared code base, wherein the individual line items are displayed within the corresponding folders in which the individual line items are contained, and
activity information displayed with the display areas and the individual line items, wherein the activity information represents activity of a group of developers in connection with the shared code base and indicates that a first developer from the group currently has an individual file in the shared code base open in a software development platform while the software development platform is in a debug mode; and
provide the user interface to a second developer from the group other than the first developer that currently has the individual file open in the software development platform.

10. The system of claim 9, the user interface further comprising:
an icon adjacent to another individual file indicating that the another individual file has been checked out by a third developer from the group.

11. The system of claim 9, wherein the activity information also indicates that the individual file is currently in focus in the software development platform when the first developer is currently viewing the individual file in the software development platform.

12. The system of claim 9, wherein the activity information comprises a rectangular border having a first color and the first color indicates that the individual file is currently being debugged.

13. The system of claim 9, wherein the display areas are rectangular.

14. The system of claim 9, wherein the activity information further identifies a particular method or particular class that is currently being debugged in the individual file.

15. The system of claim 9, embodied as an individual computing device.

16. The system of claim 15, wherein the individual file is currently in the debug mode on a computing device other than the individual computing device.

17. The system of claim 9, wherein the computer-executable instructions further cause the processing unit to:
communicate with a database storing data reflecting the activity of the group of developers to obtain the activity information.

18. A method performed by at least one computing device, the method comprising:
producing a user interface having a spatial layout of a set of hierarchical shared resources having a plurality of hierarchy levels, the user interface comprising:
a first set of display areas listing first names of a first level of shared resources in the set of hierarchical shared resources,
a second set of display areas listing second names of a second level of shared resources in the set of hierarchical shared resources, wherein the second level is relatively lower in the plurality of hierarchy levels than the first level, and
activity information that is displayed on the user interface with the first set of display areas and the second set of display areas, the activity information relating to activity of a group of users using the set of hierarchical shared resources,
wherein the set of hierarchical shared resources are associated with a repository and the activity information displayed on the user interface identifies a first developer from the group of users that currently has an individual shared resource open; and
providing the user interface to a second developer from the group of users other than the first developer that currently has the individual shared resource open.

19. The method of claim 18, wherein the first level of shared resources comprises a plurality of folders, the second level of shared resources comprises a plurality of source code files, and the individual shared resource is an individual source code file that the first developer currently has open in a software development environment.

20. The method of claim 19, wherein the activity information comprises a particular color provided in association with the source code file that conveys that the source code file is currently open in the software development environment.

* * * * *